Dec. 15, 1953  E. R. CAPPELLE  2,662,627
COIN-CONTROLLED MILEAGE METERING DEVICE
Filed March 18, 1950  3 Sheets-Sheet 1

Inventor:
Emil R. Cappelle
By Mart R. Kraus
Atty.

Dec. 15, 1953  E. R. CAPPELLE  2,662,627
COIN-CONTROLLED MILEAGE METERING DEVICE
Filed March 18, 1950  3 Sheets-Sheet 2
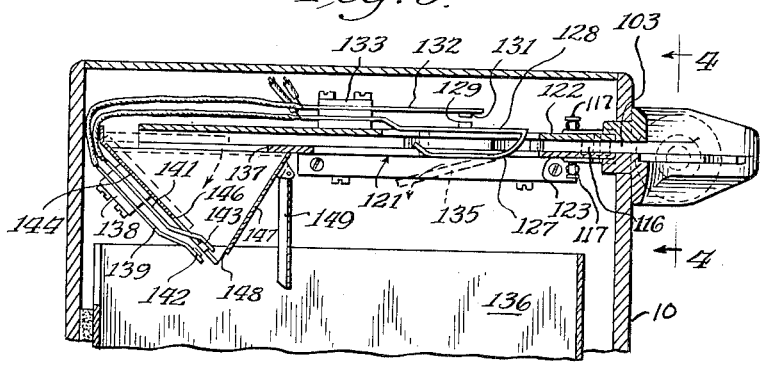
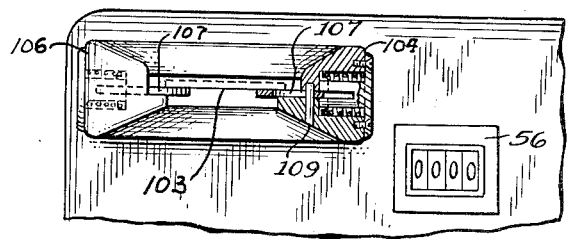
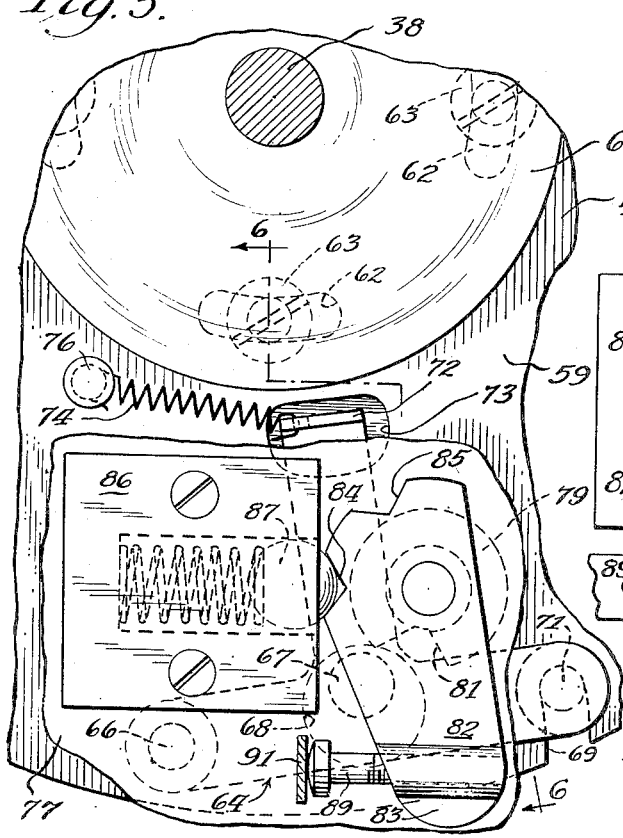
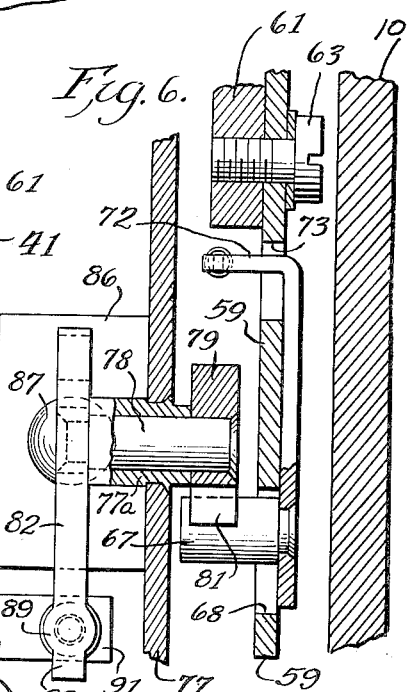
Inventor
Emil R. Cappelle
By Max R. Kraus
Atty.

Dec. 15, 1953   E. R. CAPPELLE   2,662,627
COIN-CONTROLLED MILEAGE METERING DEVICE
Filed March 18, 1950   3 Sheets-Sheet 3

Inventor
Emil R. Cappelle
By Max R. Kraus
Atty.

Patented Dec. 15, 1953

2,662,627

UNITED STATES PATENT OFFICE 2,662,627

COIN-CONTROLLED MILEAGE METERING DEVICE

Emil R. Cappelle, Chicago, Ill.

Application March 18, 1950, Serial No. 150,425

9 Claims. (Cl. 194—16)

My invention relates to a coin controlled mileage metering device, and more particularly to such a device for use in connection with an automobile.

It is generally known that a large portion of purchasers of automobiles usually purchase on the installment plan and usually experience financial inconvenience in meeting the installment payments when they become due. The necessity for meeting obligations of this type at monthly intervals creates hardships on the part of the purchasers since, in many cases, the purchasers of automobiles on the installment plan live on a hand to mouth basis. Accordingly, it is an object of my invention to provide means carried within an automotive vehicle whereby a driver purchaser, in order to drive the car, is required at certain intervals to insert coins of certain monetary values so as to condition the apparatus so that the vehicle may be driven for a predetermined number of miles, and after that point has been reached, a signal is actuated which notifies the driver that the allowed mileage covered by previously inserted coins has been exhausted and that in order to continue operating the vehicle, additional coins should be inserted, the insertion of one or more coins conditioning the apparatus to shut off the actuation of the signal. Thus, the driver is involuntarily caused to contribute daily toward the monthly payment, and when the same becomes due there is no hardship in meeting it. It is contemplated that the apparatus will be installed by a seller of an automobile and, when each installment payment becomes due, the purchaser will permit the seller to remove the money contained within the apparatus and to apply the same to the account of the purchaser. Any deficiency in the amount required to satisfy the payment is of course made up by the purchaser of the vehicle. The coins contained within the apparatus are not accessible to the purchaser of the car and may be removed only upon the use of a suitable key retained by the seller.

Another object of my invention is the provision of a device of the foregoing character which is simple in construction, compact in organization and highly efficient for the purposes intended.

Other and further objects and advantages of my invention will become apparent from the following description when considered in connection with the accompanying drawings, in which:

Fig. 3 is a cross-sectional view taken substantially on line 3—3 of Fig. 2.

Fig. 4 is a cross-sectional view taken substantially on line 4—4 of Fig. 3.

Fig. 5 is an enlarged fragmentary cross-sectional view taken substantially on line 5—5 of Fig. 2.

Fig. 6 is a cross-sectional view taken substantially on line 6—6 of Fig. 5, and

Figure 1:
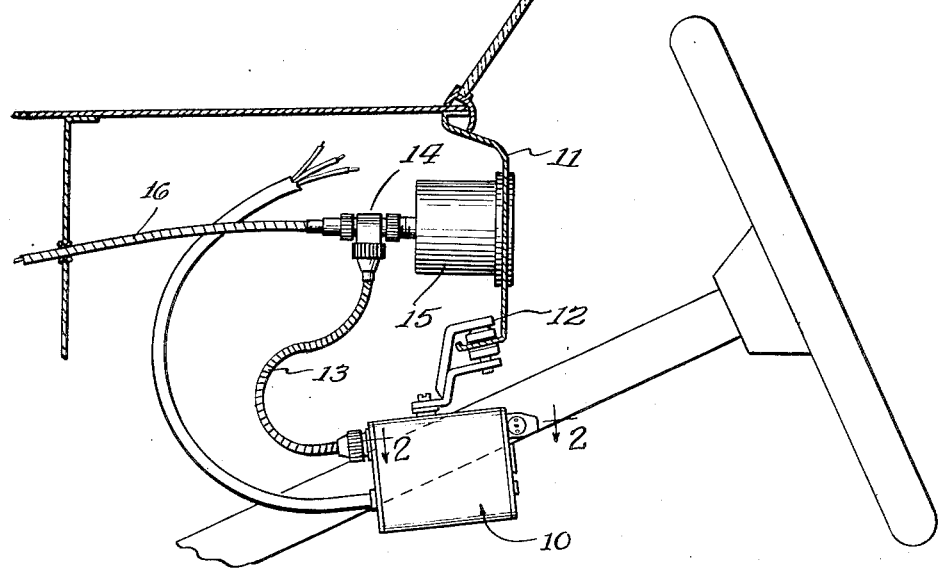
Fig. 1 is a cross-sectional view through the forward portion of an automotive vehicle showing my apparatus installed under the dashboard and operatively connected to the driving shaft of the speedometer.

Referring to the drawings, the numeral 10 indicates a housing which may be secured under the dashboard 11 of an automotive vehicle, as by a bracket 12. Suitably connected into the housing 10 is a flexible shaft 13 connecting into an adapter 14 interposed between the speedometer shaft 16 and the speedometer 15. The adapter may include a worm gear having a 20 to 1 ratio, so that for every twenty revolutions of the speedometer cable 16, the cable within the shaft 13 is caused to rotate one revolution. The cable of the flexible shaft 13 extends into the housing 10 and is operatively connected with a pinion 17 which meshes with a spur gear 18 fixed on a shaft 19. Fixed on the shaft 19 is a pinion 21 which is adapted to mesh with spur gear 22 fixed on shaft 23. Fixed on the said shaft is a pinion 24 which is adapted to mesh with spur gear 26 which is fixed on shaft 27. The said shaft carries a pinion 28 which is adapted to mesh with spur gear 29 fixed on shaft 31, which also carries a pinion 32 adapted to mesh with spur gear 33 carried on shaft 34. It will be noted that the ratios between the respective pinions and the cooperating spur gears are in each case 1 to 20 so that through the train of gears herein described, including the worm gear adapter 14, a ratio of 1,000,000 to 1 is effected.

Figure 2:
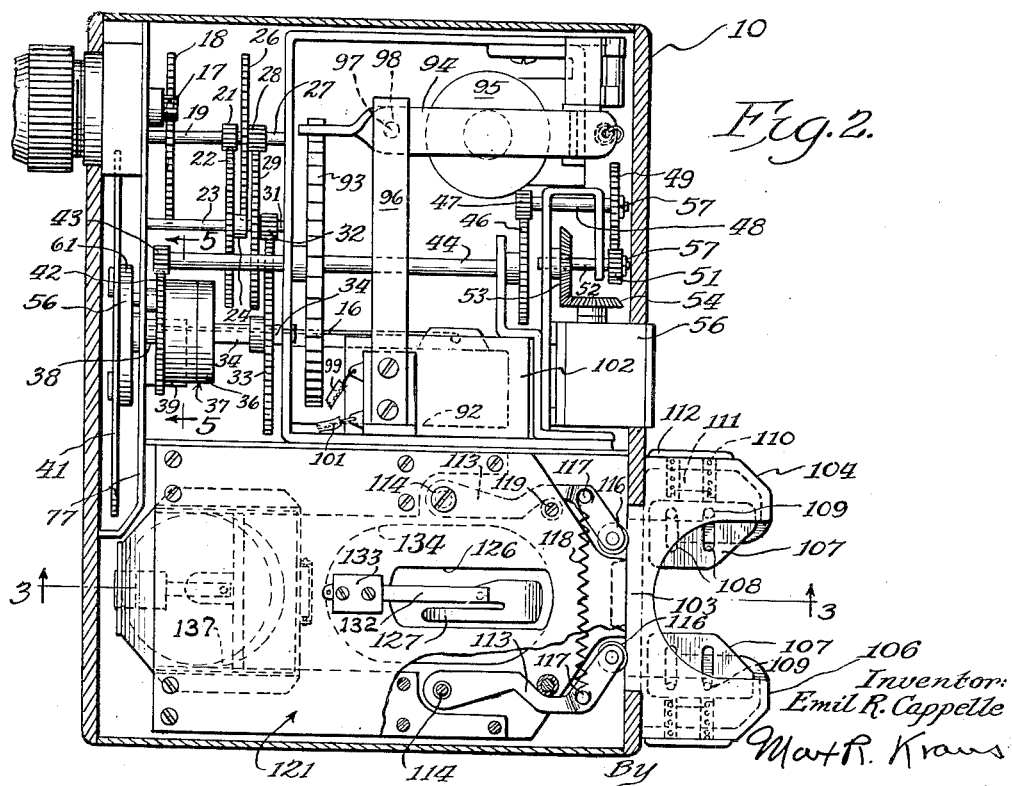
Fig. 2 is a cross-sectional view, on an enlarged scale, taken substantially on line 2—2 of Fig. 1.

Carried on the shaft 34 for rotation therewith is an armature 36 of a magnetic clutch, indicated generally at 37. The armature 36 is preferably circular in form and is comprised of a highly permeable iron disc having low residual magnetism. The electro-magnet 39 of the clutch 37 is fixed on shaft 38 which is coaxially disposed relative to shaft 34. Mounted on shaft 38 for rotation therewith is a control member 41, hereinafter to be described. Also fixed on the said shaft is a gear 42 which is in operative engagement with a pinion 43 mounted on shaft 44. Mounted on the opposite end of the said shaft is a gear 46 which is adapted to mesh with pinion 47 mounted on shaft 48 which has at its opposite end a gear 49 adapted to mesh with a pinion 51 mounted on shaft 52. A miter gear 53 is mounted on shaft 52 and is adapted to engage with a complementary miter gear 54 suitably mounted on the driving shaft of a registering counter, indicated generally at 56. The gears 49 and 51, as will be seen in Fig. 2, are mounted on the ends of shafts 48 and 52 and are retained thereon by suitable nuts, such as 57. The said gears are arranged to be removable so that changes in the gear ratios may be effected by positioning on the respective shafts various combinations of gears. Thus, through the use of a particular combination of gears, a desired rotational relationship between the control member 41 and the driving shaft of the counter 56 may be obtained.

The control member 41 comprises a disc 59 secured to a hub plate 61 fixed on the shaft 38. The said disc is provided with a plurality of equally spaced arcuate slots 62 through which are passed bolts 63 for effecting securement of the disc 59 to the hub 61. It will be apparent that the slots 62 permit relative movement between the disc member 59 and hub 61 so that accurate adjustment of the disc 59 relative to other parts may be effected.

A member, generally indicated at 64, is shaped substantially like an inverted T and is pivotally secured to the disc member 59 by a pin 66 carried thereon. The member 64 carries a pin 67 which projects at right angles to the plane thereof and extends through an opening 68 in the disc 59. As will be clearly seen by reference to Figs. 5 and 6, the opening 68 is substantially larger than the pin 67 so that the member 64 may be pivotally moved about the pin 66.

The peripheral edge of the disc 59 is notched, as at 69, to accommodate a pin 71 carried on the member 64. The pin is adapted to slide within the notch 69 which serves to limit the pivotal movement of the member 64. The vertically disposed leg of the member 64 is provided at the top with a flange 72 which projects through an opening 73 in the disc 59. The flange 72 is provided with a perforation to engage one end of a coil spring 74, the other end of which is anchored on a pin 76 mounted on the face of the disc 59. The spring 74 acts to draw the member 64 in a counterclockwise direction, as viewed in Fig. 5, so that the pin 71 is abutted against the end of the notch 69. Suitably supported in wall 77 as by a sleeve 77a is a stub shaft 78, on one end of which is formed a member 79 which is circular in form, but is provided with a cutout 81. Fixed on the other end of the shaft 78 is a member 82 which is shaped substantially as shown in Fig. 5 and is provided with a depending arm 83 and an arcuate portion having two spaced notches 84 and 85 respectively. A detent 86 is mounted on the wall 77 and is provided with a spring biased ball 87 which is adapted to cooperate with either of the notches 84 or 85 to lock the member 82 in one of two positions of operation. Carried on the lower portion of the depending arm 83 is a threaded member which may be in the form of a bolt 89 which is adapted to engage the actuating arm 91 of a micro-switch 92.

Fixed on shaft 44 for rotation therewith is a ratchet wheel 93 which is actuated by an armature 94 associated with the relay 95, the combination forming a stepping relay. The armature 94 is adapted to engage one blade of a switch stack 96 which includes a pair of spaced contact points 97 and 98. A buzzer 102 is connected in the circuit, as will be hereinafter explained.

The coin receiving mechanism will now be described. Mounted on the housing 10, on opposite sides of a slot 103 in a wall thereof, are a pair of complementary members 104 and 106, each of which includes a slidable plate 107 provided with a pair of spaced elongated slots 108 in which are accommodated pins 109 which serve to limit the movement of the slides 107. A compression spring 110 retained by a cylindrical member 111 integral with a cap 112 serves to urge the members 107 toward each other, as illustrated in Fig. 2. The cap 112 is suitably secured to the members 104 and 106 as by screws. The members 107 serve as a platform for supporting a coin when the same is positioned thereon preparatory to insertion into the apparatus through the slot 103.

Disposed interiorly of the housing 10 are a pair of opposed pivotally mounted arms 113, pivoted as at 114, and each having at its free end a roller 116. The arms 113 have pins 117 projecting therethrough for anchoring springs 118, at each end thereof, the said springs serving to urge the arms 113 inwardly in a direction toward each other, the inward movement of the arms being limited by stops 119. As will be seen more clearly by reference to Fig. 3, two springs 118 are provided, one above and one below the arms 113. Aligned with the slot 103 is a chute 121 formed of upper and lower plate members 122 and 123. The said members each are provided with cutouts, the upper member 122 having an opening 126 through which projects a finger 127 integral with a blade 128 carrying a contact point 129. A cooperating contact 131 is carried on blade 132 and both blades 128 and 132 are mounted in a suitable insulated support 133 to form a stack switch. The lower member 123 is provided with an opening 134 which is of sufficient width to permit a coin to pass therethrough, as for example a quarter.

As will be seen clearly in Fig. 3, the finger 127 is disposed in the path of the chute 121 so that any coins passing therethrough, in a manner as will be hereinafter explained, will cause the blade 128 to be deflected upwardly so that contacts 129 and 131 are engaged to complete an electrical circuit. The resilience of the blade 128 deflects the coin 135 downwardly where it falls into a suitable receptacle 136. A second opening 137 is provided at the rearward portion of the member 123, the said opening being larger than the opening 134 so as to accommodate a coin of larger denomination, as for example a half dollar.

Arranged beneath the opening 137 is a stack switch formed of an insulating support 138 which carries a pair of blades 139 and 141 in a downwardly inclined position, preferably about 45° with the member 123. The blades 139 and 141 carry contact points 142 and 143, respectively. A guide plate 144 depends from the chute 121 in an inclined position and, as will be seen in Fig. 3, is provided with an opening or slot 146 through which the blade 141 projects. The guide plate 144 connects with a depending plate 147 which is disposed at an acute angle with respect to the guide plate 144 and is provided with a slot 148 through which a coin may pass. A swinging gate 149 depends from the member 123 and serves to deflect any coin, such as 135, from impinging on the blade 139, thereby to cause inadvertent engagement of the contacts 142 and 143.

Figure 7:
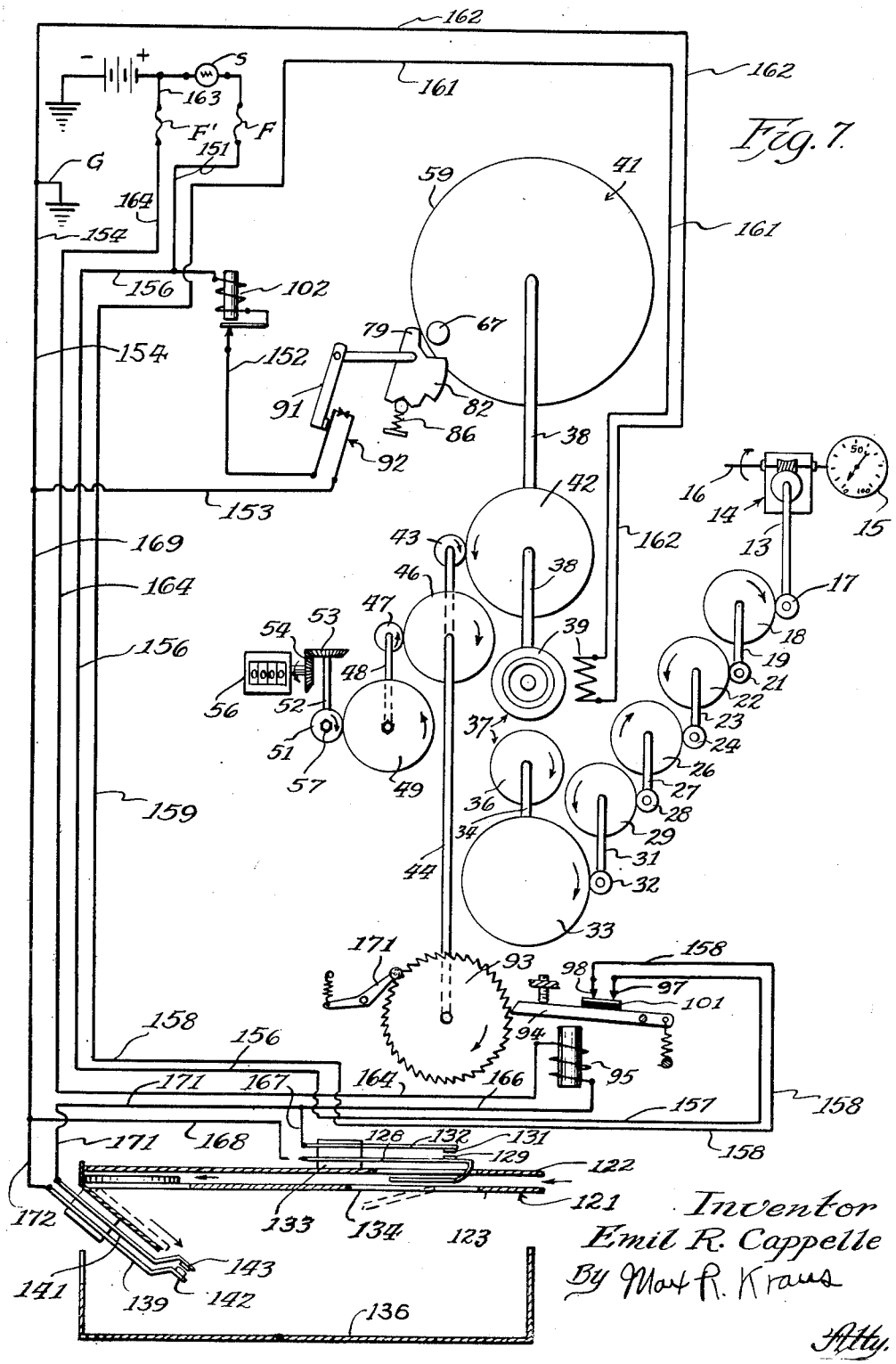
Fig. 7 is a diagrammatic view showing the general organization of the apparatus.

The operation of my device will now be described, and in order to facilitate understanding of the same reference will be had in particular to Fig. 7 which shows diagrammatically the structural elements of my invention, their relation to each other and the electrical circuits connecting the various electrical components of my invention.

It is known that the speedometers of conventional automotive vehicles are so arranged that for every mile travelled by a vehicle, the speedometer drive shaft will rotate 1,000 revolutions. Thus, with the gear ratio of 1,000,000 to 1 the control member 41 will be caused to complete one complete revolution for every 1,000 miles of vehicle travel, and as viewed in Fig. 7, the said control member will rotate in a clockwise direction. Assuming that the ignition switch S is operated to close the ignition circuit and that the control member 41 is at zero setting, the buzzer 102 under such conditions will be energized to produce a sound signal. The energizing circuit for the buzzer leading from the positive terminal of the battery through the ignition switch S, fuse F, conductor 151, buzzer 102, conductor 152, through the contacts of the micro-switch 92 which, in the condition illustrated, are in engagement, through conductor 153, conductor 154 and to ground G which is electrically connected with the negative terminal of the battery. Correspondingly, when the ignition circuit is closed, the electro-magnet 39 of the magnetic clutch 37 is energized so that the clutch is in operative condition, the energizing circuit for the magnetic clutch 37 leading from the positive terminal of the battery, through ignition switch S, fuse F, conductors 151, 156, 157, contacts 97 and 98, conductors 158, 159, 161, through the electro-magnet coil 39 of the clutch 37, conductor 162 and to ground G. Thus, rotation of the speedometer cable evidencing travel of the car is transmitted to the gear train beginning with pinion 17 and ending with spur gear 33, through magnetic clutch 37, shaft 38, to rotate the control member 41 in a clockwise direction.

As will be seen clearly by reference to Figs. 5 and 6, as the control member 41 rotates in clockwise direction the pin 67 carried on the pivoted member 82 is caused to engage the member 79. The pin 67 thus, is urged by the spring 74 into engagement with the recess 81. Continued rotation of the control member 41 effects a rocking of the member 79 clockwise to the position shown in Fig. 5, wherein the ball 87 of the detent 86 engages the recess 84 on the member 82. Since the member 82 is fixed on the spur shaft 78, it will be apparent that it will rock correspondingly with the member 79. When the member 82 is moved to the position illustrated in Fig. 5, the control member may continue to rotate in a clockwise direction without further effect on the position of member 82. When the member 82 is rocked clockwise, the member 89 engages the arm 91 to effect engagement of the contacts of the micro-switch 92. This is the condition as was hereinabove described in which the buzzer is energized to produce a sound signal. It will be apparent that the buzzer 102 will continue to emit a sound signal so long as the ignition switch S is closed while the car is in operation.

It will also be apparent that so long as the member 82 is in the position illustrated in Fig. 5, the contacts of micro-switch 92 will remain engaged and the energizing circuit through the buzzer 102 will remain closed, therefore, causing the same to emit a sound signal. Thus, so long as the ignition switch is closed the buzzer will remain energized. In order to stop the buzzing sound, either the ignition switch S must be opened or certain of the elements must be conditioned in a manner, as will be hereinafter described, so as to open the circuit to the buzzer. This can be accomplished by the insertion of one or more coins of predetermined value into the accommodating slot, as will be presently described.

Referring particularly to Figs. 2, 3 and 4, a coin, for example of the denomination of a quarter, is positioned in the recess between the coin receiving elements 104 and 106 and is laid on the platforms 107. When the operator pushes on the coin, as with his thumb, it will be seen that the members 107, which are resiliently urged toward each other, separate to permit the thumb to pass therebetween. Thus, insertion of the coin is facilitated even in poor light or while the vehicle is in motion. At the same time, the coin engages the rollers 116 on the pivoted members 113 and the said members are urged apart a sufficient distance to accommodate the coin, it being understood that the rollers 116 are in engagement with the periphery of the coin. At a point past the diametral dead center of the coin, the springs 118 in urging the members 113 inwardly will project the coin forcibly in the chute 121. The coin in passing through the chute engages the finger 127 and correspondingly urges the blade 128 upwardly so that contacts 129 and 131 are engaged, thereby closing a circuit through the stepping relay 95, as will be presently explained. The energizing circuit for the relay 95 leads from the positive pole of the battery, through conductor 163, fuse F', conductor 164, through the solenoid of relay 95, through conductors 166, 167, blade 132, contacts 131 and 129, blade 128, conductors 168, 169 to the ground G. It will be apparent that the energization of the solenoid of relay 95 is momentary, since the coin 135 is caused to drop through the opening 134 and fall into the coin receptacle 136. This momentary energization of the relay 95 effects a downward movement of the armature 94 which engages the ratchet wheel 93 and moves the same a distance of one tooth, the movement of the said ratchet wheel being controlled by a roller detent 171. Rotation of the ratchet wheel 93 is transmitted through the shaft 44 to pinion 43 which is in engagement with spur gear 42 and effects rotation of shaft 38 and with it the control member 41 in a counterclockwise direction. If the position of the pin 67 on the control member 41 is such that it is substantially at the zero setting with respect to the member 82, it will be seen by reference to Fig. 5, that the pin 67 will engage in the slot 81 of the member 79 and rock the same in a counterclockwise direction effecting a corresponding movement of the member 82 so as to position the ball 87 of the detent 86 in the recess 85. In this last mentioned position, the member 89 does not bear on the arm 91 and consequently the contacts 92 of the micro-switch are separated, thereby opening the circuit to the buzzer and arresting the energization of the same with a consequent cessation of the signal sound produced thereby. Similarly, the energization of the stepping relay 95 effects a break in the circuit between contacts 97 and 98, thereby opening the energizing circuit to the magnetic clutch 39 and breaking the driving connection between the shaft 34 and shaft 38 leading to the control member 41. Movement of the ratchet wheel 93, as hereinabove described, effects through shaft 44, spur gear 46, pinion 47, shaft 48, change gears 49 and 51, shaft 52, bevel gears 53 and 54, a rotation of the shaft of registering counter 56 to set the same at a predetermined value, for example 5, thus indicating to the operator that payment has been made and that the automotive vehicle may travel a distance of 5 miles before the buzzer will again be energized.

If the vehicle is or has been driven with the buzzer energized, which is an indication that no coins have been placed within the device, the control member 41 continues to rotate in a clockwise direction and, assuming that the car has travelled a distance of 50 miles, under such conditions, the control member 41 will have rotated in a clockwise direction 1/20 of a revolution, since in the ratio employed in the present embodiment the control member rotates 1/200 of one revolution for every 5 miles of movement of the vehicle which corresponds to a distance of movement of one notch by the ratchet wheel 93. Thus, the operator in order to return the control member 41 to a position where the buzzer is deenergized is required to insert within the device, a sufficient number of coins which will so position the member 82 that the contacts of the micro-switch 92 are in separated relation. Thus an operator, if he overruns the mileage permitted by the insertion of a particular number of coins, is required to make up the deficiency before the buzzer will be silenced.

The coin receiving mechanism is adapted for receiving coins of two denominations, in this particular instance twenty-five and fifty cent pieces. If it is desired to insert a fifty cent piece, the coin is placed upon the platform members 107 in the manner hereinabove described, and when it is pushed forwardly and is engaged by the rollers 116 of arms 113 and projected, as above described, the coin, because it is larger than the width of the opening 134, will pass thereover and will be projected toward the end of the chute 121 over the opening 137 where it will fall on the guide plate 144 and engage the blade 141 to cause the contacts 142 and 143 to complete a circuit through the stepping relay 95, the energizing circuit for the relay leading from the positive terminal of the battery, through conductor 163, fuse F', conductor 164, through the relay 95, through conductors 166, 171, blade 141, through contacts 142 and 143, through blade 139, conductor 172 and conductor 169 to the ground G.

It will be observed however that the coin of the larger denomination in passing through the chute 121 displaces the finger 127 which effects engagement of the contacts 129 and 131, in the manner hereinabove described. Thus, an energizing circuit is established at that particular time through the relay 95 to actuate the same so as to rotate the ratchet wheel 93 one step and, again in the final travel of the coin, the contacts 142 and 143 are engaged so as to close an energizing circuit through the relay 95 so as to again effect rotation of the ratchet wheel 93 another tooth. Thus, it will be seen when a coin of smaller denomination is used, the ratchet wheel 93 will move only a distance of one tooth, while when a coin of double denomination is used the ratchet wheel will move a distance of two successive teeth, thereby correspondingly moving the control member 41 and registering on the counter that a certain number of miles are available for driving before the buzzer will again be energized to produce a sound signal.

It is to be understood that it is within the contemplation of my invention to utilize the same to operate any audible or visible signal or even to control the ignition circuit. The latter however is believed impractical for reasons of safety.

I claim:

1. A device of the character described comprising a rotatable control member, a train of gears operatively connected to the speedometer drive of an automotive vehicle for rotating said control member in one direction, a magnetic clutch interposed between said train of gears and said control member, signal means, a stepping relay operatively connected with said control member to rotate the same in an opposite direction, coin receiving means, a first switch disposed in the path of travel of a coin within said coin receiving means and connected in electrical circuit with said stepping relay, said first switch when a coin is inserted in said coin receiving means being adapted to close an electrical circuit through said relay whereby to effect actuation of said relay to move said control means in an opposite direction an incremental distance, a second switch in electrical circuit with said signal means and operable by the movement of said control member to control the energization of said signal means, and a third switch operable by the movement of said relay and in electrical circuit with said magnetic clutch, said switch when said relay is actuated opening the circuit through said clutch thereby deenergizing said clutch and breaking the driving connection between said train of gears and said control member.

2. A device of the character described comprising a rotatable control member, a train of gears operatively connected to the speedometer drive of an automotive vehicle for rotating said control member in one direction, a magnetic clutch interposed between said train of gears and said control member, signal means, a stepping relay operatively connected with said control member to rotate the same in an opposite direction, coin receiving means, a first switch disposed in the path of travel of a coin within said coin receiving means and connected in electrical circuit with said stepping relay, said first switch when a coin is inserted in said coin receiving means being adapted to close an electrical circuit through said relay whereby to effect actuation of said relay to move said control means in an opposite direction an incremental distance, a second switch in electrical circuit with said signal means and operable by the movement of said control member to control the energization of said signal means, a third switch operable by the movement of said relay and in electrical circuit with said magnetic clutch, said switch when said relay is actuated opening the circuit through said clutch thereby deenergizing said clutch and breaking the driving connection between said train of gears and said control member, and a registering counter operatively connected with said stepping relay and adapted to additively register incremental movements thereof.

3. A device of the character described comprising a rotatable control member, speed reducing means operatively connected to the speedometer drive of an automotive vehicle for rotating said control member in one direction, a magnetic clutch interposed between said speed reducing means and said control member, signal means, a stepping relay operatively connected with said control member to rotate the same in an opposite direction, coin receiving means, a first switch disposed in the path of travel of a coin within said coin receiving means and connected in electrical circuit with said stepping relay, said first switch when a coin is inserted in said coin receiving means being adapted to close an electrical circuit through said relay whereby to effect actuation of said relay to move said control means in an opposite direction an incremental distance, a second switch in electrical circuit with said signal means and operable by the movement of said control member to control the energization of said signal means, and a third switch operable by the movement of said relay and in electrical circuit with said magnetic clutch, said switch when said relay is actuated opening the circuit through said clutch thereby deenergizing said clutch and breaking the driving connection between said train of gears and said control member.

4. A device of the character described comprising a rotatable control member, a train of gears operatively connected to the speedometer drive of an automotive vehicle for rotating said control member in one direction, a magnetic clutch interposed between said train of gears and said control member, signal means, a stepping relay operatively connected with said control member to rotate the same in an opposite direction, a coin receiving means, a first switch disposed in the path of travel of a coin within said coin receiving means and connected in electrical circuit with said stepping relay, said first switch when a coin is inserted in said coin receiving means being adapted to close an electrical circuit through said relay whereby to effect actuation of said relay to move said control means in an opposite direction an incremental distance, a second switch in electrical circuit with said signal means and operable by the movement of said control member to control the energization of said signal means, a third switch operable by the movement of said relay and in electrical circuit with said magnetic clutch, said switch when said relay is actuated opening the circuit through said clutch thereby deenergizing said clutch and breaking the driving connection between said train of gears and said control member, and means operatively connected with said control member for operating said second switch, said control member when rotated in one direction effecting closing of said second switch and effecting energization of said signal means and when rotated in an opposite direction effecting opening of said second switch and deenergization of said signal means.

5. A device of the character described comprising a rotatable control member, a train of gears operatively connected to the speedometer drive of an automotive vehicle for rotating said control member in one direction, a magnetic clutch interposed between said train of gears and said control member, signal means, a stepping relay operatively connected with said control member to rotate the same in an opposite direction, coin receiving means, a first switch disposed in the path of travel of a coin within said coin receiving means and connected in electrical circuit with said stepping relay, said first switch when a coin is inserted in said coin receiving means being adapted to close an electrical circuit through said relay whereby to effect actuation of said relay to move said control means in an opposite direction an incremental distance, a second switch in electrical circuit with said signal means and operable by the movement of said control member to control the energization of said signal means, a third switch operable by the movement of said relay and in electrical circuit with said magnetic clutch, said switch when said relay is actuated opening the circuit through said clutch thereby deenergizing said clutch and breaking the driving connection between said train of gears and said control member, a registering counter operatively connected with said stepping relay and adapted to additively register incremental movements thereof, and means operatively connected with said control member for operating said second switch, said control member when rotated in one direction effecting closing of said second switch and effecting energization of said signal means and when rotated in an opposite direction effecting opening of said second switch and deenergization of said signal means.

6. A device of the character described comprising a rotatable control member, a train of gears operatively connected to the speedometer drive of an automotive vehicle for rotating said control member in one direction, a magnetic clutch interposed between said train of gears and said control member, signal means, a stepping relay operatively connected with said control member to rotate the same in an opposite direction, coin receiving means, a pair of spaced switches disposed in the path of travel of said coin, said switches when a coin is inserted in said coin receiving means being adapted to successively close in sequence an electrical circuit through said relay whereby to effect two successive actuations of said relay to move said control member in an opposite direction two increments of rotation, a third switch in electrical circuit with said signal means and operable by the movement of said control member to control the energization of said signal means, and a fourth switch operable by the movement of said relay and in electrical circuit with said magnetic clutch, said switch when said relay is actuated opening the circuit through said clutch thereby deenergizing said clutch and breaking the driving connection between said train of gears and said control member.

7. A device of the character described comprising a rotatable control member, a train of gears operatively connected to the speedometer drive of an automotive vehicle for rotating said control member in one direction, a magnetic clutch interposed between said train of gears and said control member, signal means, a stepping relay operatively connected with said control member to rotate the same in an opposite direction, coin receiving means, a pair of spaced switches disposed in the path of travel of said coin, said switches when a coin is inserted in said coin receiving means being adapted to successively close in sequence an electrical circuit through said relay whereby to effect two successive actuations of said relay to move said control member in an opposite direction two increments of rotation, a third switch in electrical circuit with said signal means and operable by the movement of said control member to control the energization of said signal means, a fourth switch operable by the movement of said relay and in electrical circuit with said magnetic clutch, said switch when said relay is actuated opening the circuit through said clutch thereby deenergizing said clutch and breaking the driving connection between said train of gears and said control member, and a registering counter operatively connected with said stepping relay and adapted to additively register incremental movements thereof.

8. A device of the character described comprising a rotatable control member, speed reducing means operatively connected to the speedometer drive of an automotive vehicle for rotating said control member in one direction, a magnetic clutch interposed between said speed reducing means and said control member, signal means, a stepping relay operatively connected with said control member to rotate the same in an opposite direction, a coin chute, means associated with said chute to project a coin through said chute, a first switch disposed in the path of travel of a coin through said chute and connected in electrical circuit with said stepping relay, said first switch when a coin is inserted in said chute being adapted to close an electrical circuit through said relay whereby to effect actuation of said relay to move said control means in an opposite direction an incremental distance, a second switch in electrical circuit with said signal means and operable by the movement of said control member to control the energization of said signal means and a third switch operable by the movement of said relay and in electrical circuit with said magnetic clutch, said switch when said relay is actuated opening the circuit through said clutch thereby deenergizing said clutch and breaking the driving connection between said speed reducing means and said control member.

9. A device of the character described comprising a rotatable control member, a train of gears operatively connected to the speedometer drive of an automobile vehicle for rotating said control member in one direction, a magnetic clutch interposed between said train of gears and said control member, signal means, a stepping relay operatively connected with said control member to rotate the same in an opposite direction, a coin chute, means associated with said chute to project a coin through said chute, a pair of spaced switches disposed in the path of travel of said coin, said switches when a coin is inserted in said coin chute being adapted to successively close in sequence an electrical circuit through said relay whereby to effect two successive actuations of said relay to move said control member in an opposite direction two increments of rotation, a third switch in electrical circuit with said signal means and operable by the movement of said control member to control the energization of said signal means and a fourth switch operable by the movement of said relay and in electrical circuit with said magnetic clutch, said switch when said relay is actuated opening the circuit through said clutch thereby deenergizing said clutch and breaking the driving connection between said train of gears and said control member.

EMIL R. CAPPELLE.

References Cited in the file of this patent

UNITED STATES PATENTS

| Number | Name | Date |
|---|---|---|
| 1,056,147 | Browne | Mar. 18, 1913 |
| 1,069,558 | Majors | Aug. 5, 1913 |
| 1,414,910 | Watson | May 2, 1922 |
| 2,106,042 | Stark | Jan. 18, 1938 |
| 2,358,747 | Testor | Sept. 19, 1944 |
| 2,384,585 | Alexander | Sept. 11, 1945 |

FOREIGN PATENTS

| Number | Country | Date |
|---|---|---|
| 403,366 | Great Britain | Dec. 11, 1933 |